S. F. NOSKER.
Grain-Drill Attachment.
No. 227,047.  Patented April 27, 1880.
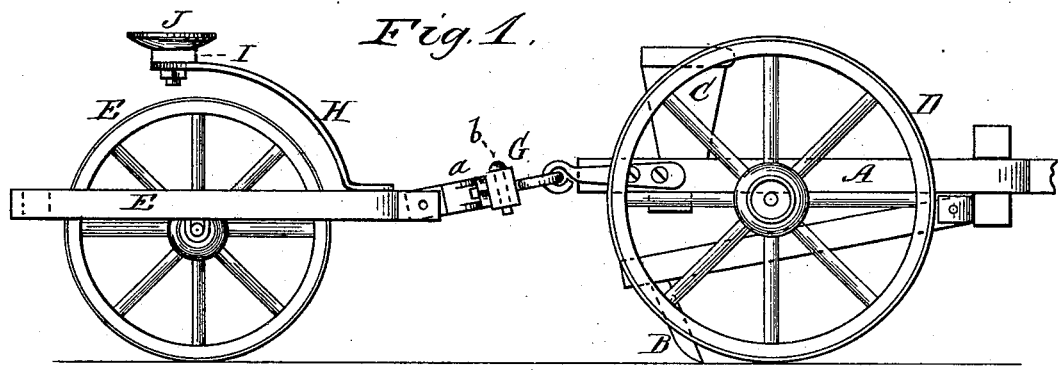
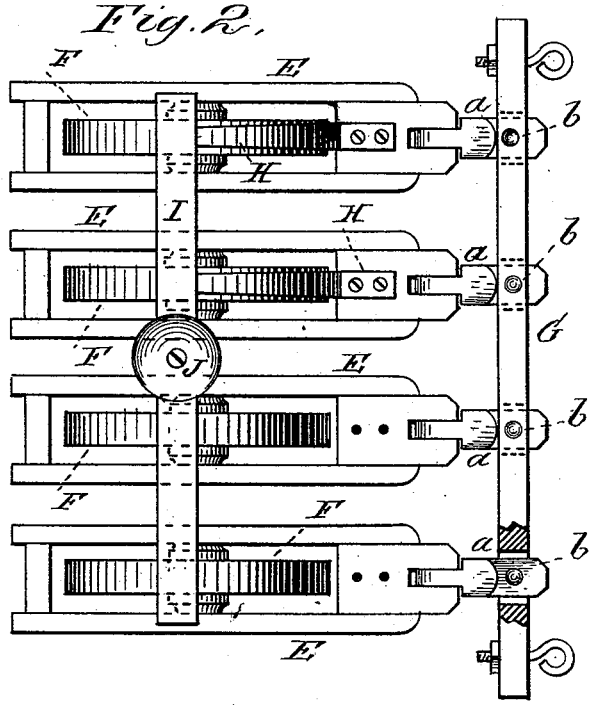

UNITED STATES PATENT OFFICE.

SAMUEL F. NOSKER, OF IROQUOIS, ILLINOIS.

GRAIN-DRILL ATTACHMENT.

SPECIFICATION forming part of Letters Patent No. 227,047, dated April 27, 1880.

Application filed December 29, 1879.

*To all whom it may concern:*

Be it known that I, SAMUEL F. NOSKER, of Iroquois, in the county of Iroquois and State of Illinois, have invented a new and valuable Improvement in Grain-Drill Attachments; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a side elevation of my invention, showing it connected to a grain-drill of the ordinary construction. Fig. 2 is a top-plan view of my invention disconnected from the drill.

The object or purpose of the present invention is to provide an attachment to grain-drills which shall have narrow rollers for the purpose of rolling or pressing the earth firmly upon the grain, thereby causing the grain to germinate more evenly and rapidly than if covered loosely, the track of such roller or wheel to be narrow and directly upon the line of the grain deposited through the drill-points, thus forming a depression, into which the earth on either side, as acted upon by the rain, frost, and thaws, shall be deposited, and thus more deeply covering the same.

The invention consists of a series of frames, each of which is provided with a wheel or roller, and a pivoted tongue passing through elongated slots in a cross-bar connected to the grain-drill and held therein by bolts, whereby the frames may have a vertical and sidewise or lateral motion independent of each other and of the grain-drill; also, in providing each of the series of frames having said vertical and lateral motion with springs connected thereto and to a cross-bar arranged above and over the wheels or rollers of the frames to which the driver's seat is attached, as will be hereinafter more fully described.

In the accompanying drawings, A represents the frame, B the teeth or drill-points, C the hopper, and D the wheels, of a grain-drill.

To this grain-drill, or any other form of drill, my attachment is connected, which consists of a series of independent frames, E, each of which has a roller or wheel, F. Each frame E has a pivoted tongue, *a*, said tongue passing through an elongated opening in a cross-bar, G, and secured by a bolt, *b*. The cross-bar G is hooked or otherwise secured to the frame of the grain-drill, so as to have a vertical motion, for the purpose hereinafter described.

The frames E, with their wheels, are in number to correspond with the number of drill-points used in the grain-drill, and are arranged directly in the rear of each point or tooth, so that the wheels or rollers E shall follow directly upon the furrow in which the grain is deposited and firmly press the soil upon the grain, and leave a narrow track or depression immediately upon the line of such grain.

The manner employed of connecting the frames E to the frame of the grain-drill admits of the frames E having a vertical motion for the purpose of rising over obstructions or sinking into depressions, thus enabling each frame independently of the other to follow the inequalities of the ground, and also to have a sidewise or lateral motion to permit of turning to either side.

It should be understood that the several frames E are so connected to the frame A of the grain-drill that their lateral and vertical movements are independent of the movement of the grain-drill. Thereby any slight sidewise movement of the frame A, caused by the irregular draft of the horses, will not affect the direct course of the rollers F and frames E. This important result would be entirely absent, and to a degree effect the successful operation of the rollers F, were the frames of the two outside rollers a continuation of the frame of the grain-drill; but by having each and every frame E, with its roller F, independent of each other and of the frame A the desired effect is obtained.

For the purpose of giving the requisite pressure upon said wheels or rollers F, and of connecting and to an extent steadying the series of independent frames E and wheels or rollers F, I connect to the forward end of each frame a flat spring, H, curving or rising upward and backward in such shape as to bring a connecting-board, I, above and out of contact with the rollers or wheels F; and attached to said board is the driver's seat J.

Having now fully described my invention, what I claim as new, and desire to secure by Letters Patent, is—

1. The combination, with a grain-drill having connected thereto the cross-bar G, of the series of frames E, provided with rollers or wheels F, said frames having pivoted tongues *a* passing through elongated slots or openings in the cross-bar, and secured by bolts *b*, substantially as and for the purpose set forth.

2. In a grain-drill, the series of frames E and wheels or rollers F, having a vertical and endwise or lateral motion, in combination with the springs H, connected to said frames and to a cross-board, I, above and over the wheels or rollers, substantially as and for the purpose specified.

In testimony that I claim the above I have hereunto subscribed my name in the presence of two witnesses.

SAMUEL F. NOSKER.

Witnesses:
W. H. McCLAIN,
ORRIN P. BISSELL.